United States Patent [19]

Hashimoto et al.

[11] Patent Number: 4,809,844

[45] Date of Patent: Mar. 7, 1989

[54] TUBULAR BELT CONVEYOR

[75] Inventors: Kunio Hashimoto; Haruo Okazaki, both of Kitakyushu, Japan

[73] Assignee: Bridgestone Corporation, Tokyo, Japan

[21] Appl. No.: 125,256

[22] Filed: Nov. 25, 1987

[30] Foreign Application Priority Data

Nov. 28, 1986 [JP] Japan .................. 61-281683

[51] Int. Cl.4 ........................................... B65G 15/08
[52] U.S. Cl. .................................. 198/819; 198/825; 198/842
[58] Field of Search ................ 198/819, 825, 826, 842

[56] References Cited

U.S. PATENT DOCUMENTS

| 3,332,537 | 7/1967 | Davidson. |
| 3,338,383 | 8/1967 | Hashimoto .......................... 198/204 |
| 3,429,422 | 2/1969 | Yoshimura. |
| 3,586,156 | 7/1971 | Easley, Jr.. |
| 3,595,378 | 7/1971 | Kamisaka. |
| 4,402,395 | 9/1983 | Hashimoto. |
| 4,565,285 | 1/1986 | Koistinen. |
| 4,625,860 | 12/1986 | Kawasaki et al. .................. 198/819 |
| 4,630,726 | 12/1986 | Hashimoto .......................... 198/819 |
| 4,653,961 | 5/1987 | Hashimoto. |
| 4,681,214 | 7/1987 | Karpisek. |
| 4,723,653 | 2/1988 | Engst ................................... 198/819 |
| 4,762,221 | 8/1988 | Hashimoto et al.. |

FOREIGN PATENT DOCUMENTS

| 943817 | 6/1956 | Fed. Rep. of Germany ...... 198/819 |
| 2752410 | 5/1979 | Fed. Rep. of Germany. |
| 2944448 | 5/1981 | Fed. Rep. of Germany. |
| 3122664 | 9/1982 | Fed. Rep. of Germany. |
| 3417718 | 11/1984 | Fed. Rep. of Germany. |
| 3606129 | 8/1986 | Fed. Rep. of Germany. |
| 1358636 | 7/1964 | France. |
| 59-149211 | 8/1984 | Japan. |
| 60-36209 | 2/1985 | Japan. |
| 0221007 | 10/1986 | Japan ................................... 198/819 |
| 196602 | 5/1967 | U.S.S.R.. |
| 571210 | 8/1945 | United Kingdom. |
| 737583 | 9/1955 | United Kingdom. |
| 959982 | 7/1964 | United Kingdom. |
| 1329973 | 9/1973 | United Kingdom. |
| 2061853 | 5/1981 | United Kingdom. |
| 2092977 | 8/1982 | United Kingdom ............... 198/819 |
| 2094741 | 9/1982 | United Kingdom. |
| 2115364 | 9/1983 | United Kingdom. |
| 2140760 | 12/1984 | United Kingdom. |

Primary Examiner—Robert J. Spar
Assistant Examiner—D. Glenn Dayoan
Attorney, Agent, or Firm—Poms, Smith, Lande & Rose

[57] ABSTRACT

A tubular belt conveyor can transport powdered or granular material without leakage. To roll up a flat belt into a tubular shape, a belt guiding device is provided in the vicinity of a front or a rear end roller. The belt guiding device comprises a base plate and a plurality of guide frames provided on the base plate. In the guide frame, a plurality of guide rollers are arranged like a circle through which the belt to be rolled up passes. The diameter of the circle formed by the guide rollers increases gradually towards the front or the rear end roller to prevent the belt from slacking so that smooth running may be assured.

5 Claims, 5 Drawing Sheets

TUBULAR BELT CONVEYOR

CROSS-REFERENCE TO RELATED APPLICATIONS

The subject matter of this application is related to the subject matter of our copending application, Ser. No. 07/190,704, filed May 5, 1988, entitled "Apparatus For Transferring Bulk Material by Outgoing and Returning Paths of an Endless Belt," and assigned to Bridgestone Corporation, the assignee of the present application; is related to the subject matter of our copending application, Ser. No. 07/062,246, filed June 15, 1987, entitled "A Tubular Belt Conveyor," and assigned to Japan Pipe Conveyor Co., Ltd.; is related to the subject matter of our application, Ser. No. 07/028,197, filed Mar. 20, 1987, entitled "Method of Conveying Materials and Tubular Belt Conveyor Therefor," and assigned to Bridgestone Corporation, the assignee of the present application, issued as U.S. Pat. No. 4,747,344 on May 31, 1988; and is related to the subject matter of an application of Kunia Hashimoto, Ser. No. 06/884,471, filed July 11, 1986, entitled "Belt Conveyor," now abandoned.

BACKGROUND OF THE INVENTION

The present invention relates to a tubular belt conveyor and more particularly to a tubular belt conveyor which comprises a belt guiding device for preventing a belt from loosening or expanding so as to assure smooth running.

As shown in FIG. 10, there is a conventional tubular belt conveyor in which an endless band-shaped conveyor belt 1 is rolled up into a tubular shape, flattened portions at the front and rear ends are wound around a front and a rear end roller to convey material which is thrown onto the front end of a forward belt 1a from a hopper 4 and is discharged onto a receiver 5 at the rear end.

The portion between a flat and a tubular portion or between a tubular and a flat portion is called "a through converting portion", and the distance therebetween is called "a trough converting distance".

In the conventional tubular belt conveyor, nylon or steel is employed as core material for the endless conveyor belt 1. As shown by a solid line in FIG. 11, the core material made of nylon is liable to lengthen and the trough converting distance is small, while what is made of steel is difficult to lengthen and the trough converting distance is large, as shown in a dotted line.

FIG. 11 shows a triangle representing the relationship between the elongation and the trough converting distance for an endless conveyor belt made of different material. The center line and both the side ends of the conveyor belt 1 are corresponding to the base and the hypotenuse of the triangle respectively. That is to say, the hypotenuse is longer than the base, which means that the side ends of the belt 1 are stretched longer than the center line.

Generally, the trough converting distance of the endless conveyor belt 1 is determined to keep the elongation less than 1%. The elongation less than 1% is within elasticity, and when the belt is formed into a tubular shape, the tubular belt becomes to have the same elongation over the whole width. In the endless steel-core conveyor belt 1, the trough converting distance lengthens so that the difference between the hypotenuse and the base becomes smaller.

As shown in FIG. 12, if the trough converting distance lengthens, the trough converting portion at the beginning part of the return belt 1b loosens by its weight, and the loosened portion increases because of the frictional resistance to which it is subject when it runs through a belt shape maintaining frame 6. Therefore, when the endless conveyor belt 1 is driven, said loosened trough converting portion moves up and down to cause surging action, so that the conveyor belt 1 travels intermittently. In other words, the running speed of the conveyor belt is not constant and the intermittent shock occurs in the belt, so that it is subject to large tension. Therefore, the front and rear end rollers around which the conveyor belt 1 is wound undergo strong force.

Also, if the conveyed material supplied from the hopper 4 is loaded ununiformly on the forward belt 1 at the trough converting portion of the beginning part, the forward belt 1a totally twists, or the side end of the belt expands over the usual tubular form because of the weight of the conveyed material, so that the elongation of the side ends of the belt increases, and the load of the belt and the weight of the conveyed material make the belt loosened, which results in the problems as mentioned above.

SUMMARY OF THE INVENTION

It is therefore an object of the present invention to provide a tubular belt conveyor comprising a belt guiding device to prevent a belt from loosening or expanding at a trough converting portion so as to assure smooth running.

According to the present invention, there is provided a tubular belt conveyor comprising a front end roller provided at the front end of the conveyor a rear end roller provided at the rear end an endless belt which is rolled up into a tubular shape for conveying material, flat portions of the belt being wound around the front and rear end rollers so that the belt may circulate between the two end rollers and a belt guiding device disposed at the portion in which the belt is rolled up from a flat shape into a tubular shape, the device comprising a base plate and a plurality of guide frames provided on said base plate the guide frame having a plurality of guide rollers arranged like a circle through which the belt to be rolled up passes, the improvement comprising that the diameter of the circle formed by the guide rollers within the guide frame increases gradually towards the front or the rear end roller.

Therefore, even if the belt is twisted around its longitudinal axis or expanded to open by the weight of the conveyed material or itself, it can be guided smoothly in a circular or an arcuate form such that its diameter increases or decreases gradually. When twisted, the belt only moves within the inscribed circle of each guide frame, but no adverse effect can be created during running.

BRIEF DESCRIPTION OF THE DRAWINGS

These and other objects as well as advantages of the present invention will become clear by the following description of a preferred embodiment of the present invention with reference to the accompanying drawings, wherein.

DETAILED DESCRIPTION OF THE PREFERRED EMBODIMENT

Figure 10:
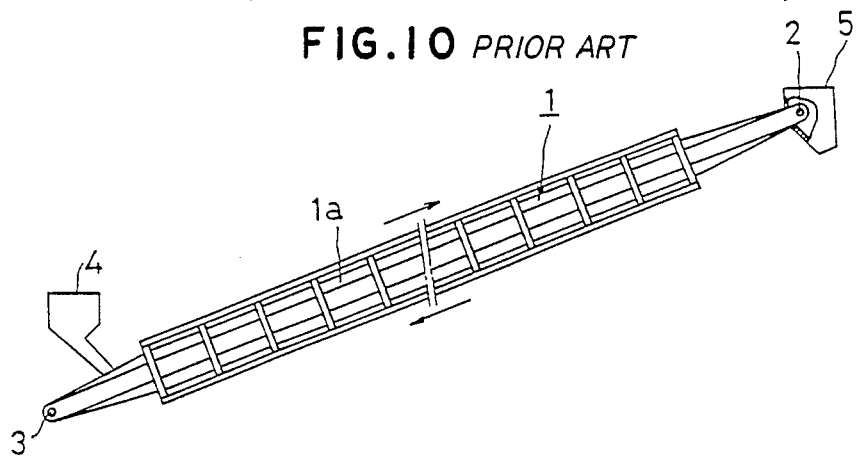
FIG. 10 is a schematic side view of a conventional tubular belt conveyor and similar to FIG. 1.
Figure 11:
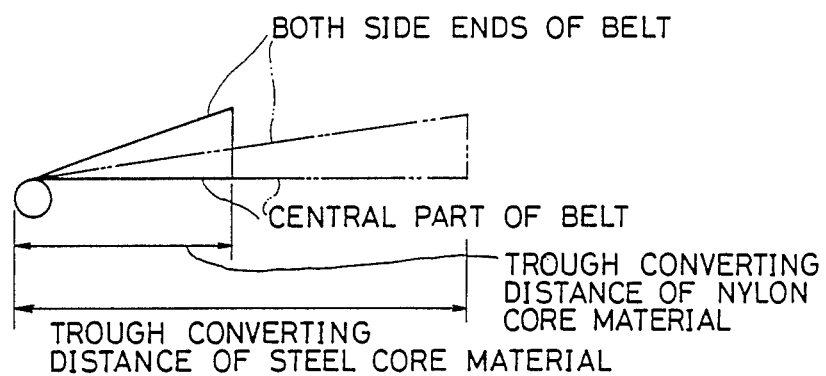
FIG. 11 is a view showing the relationship between elongation and trough converting distance for different core material, when an endless conveyor belt is employed for a tubular belt conveyor.
Figure 12:
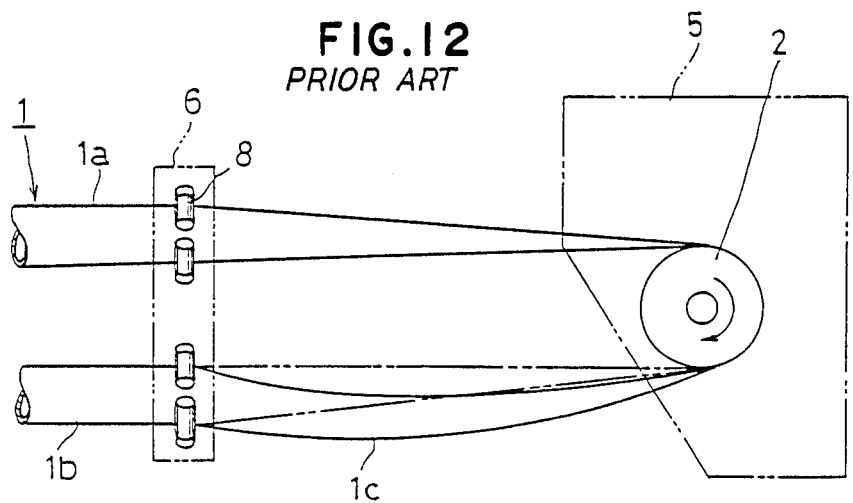
FIG. 12 is a side view similar to FIG. 4 and illustrates the conventional tubular belt conveyor.

The embodiments according to the present invention will be described in detail with reference to FIGS. 1 to 9 in appended drawings. To the parts common with those in the prior arts illustrated in FIGS. 10 to 12, tne same numerals will be given.

Figure 1:
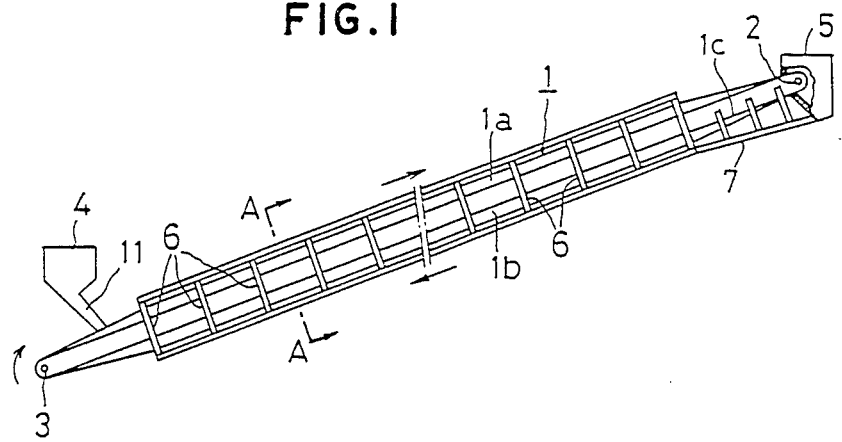
FIG. 1 is a schematic side view of a tubular belt conveyor according to the present invention in which a belt guide device is provided at the beginning part of a return belt.

FIG. 1 schematically shows a tubular belt conveyor according to the present invention in which a belt guiding device is provided at the beginning part of a return path of an endless conveyor belt. An endless conveyor belt 1, the flattened front and rear end of which are wound around a front end roller 2 and a rear end roller 3 respectively, is circulated in a direction shown by an arrow by means of drive means (not shown).

A plurality of belt shape maintaining frames 6 are provided between two end rollers 2 and 3. Between a front end belt shape maintaining frame 6 and a flattened part at the beginning end, namely, a trough converting portion, a belt guiding device 7 is disposed. The numerals 1a and 1b represent a forward and a return path respectively.

Figure 2:
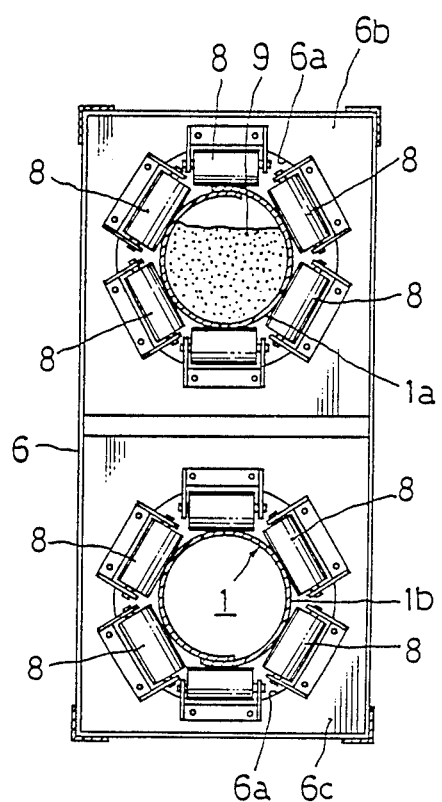
FIG. 2 is a vertical sectional view taken along line A—A in FIG. 1.

As shown in FIG. 2, each belt shape maintaining frame 6 is divided into an upper compartment 6b and a lower compartment 6c each of which includes in the center an opening 6a through which the conveyor belt 1 passes. Within each compartment 6b and 6c, a plurality of belt shape maintaining rollers 8 are arranged like a circle around the opening 6a. The numeral 9 represents conveyed material.

Figure 3:
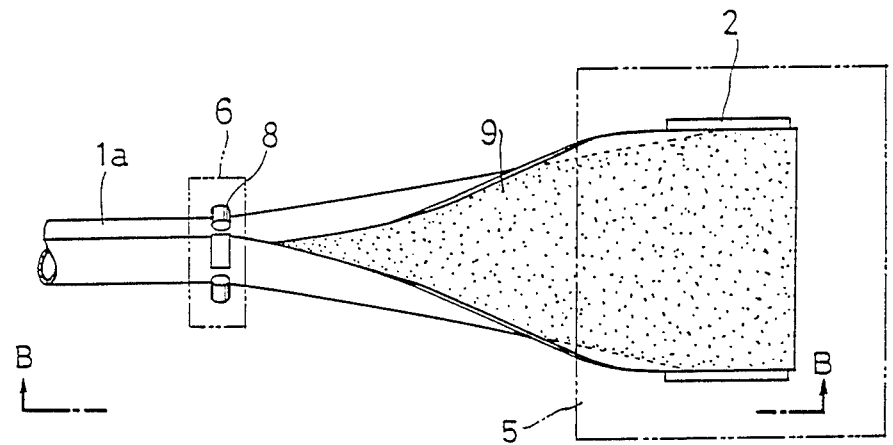
FIG. 3 is an enlarged plan view of the terminating end of the forward belt in the tubular belt conveyor shown in FIG. 1.
Figure 4:
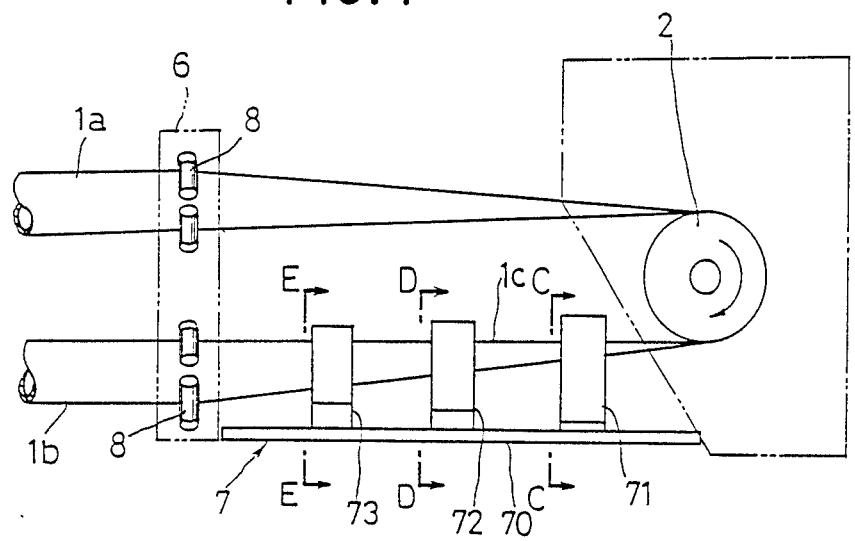
FIG. 4 is a side elevational view taken in the direction of the arrows B—B in FIG. 3.

As shown in FIGS. 3 and 4, the return path 1b running around the front end roller 2 is supported by the belt guiding device 7 at the trough converting portion adjacent to the first belt shape maintaining frame 6. The belt guiding device 7 comprises a base plate 70 which is located below the return path along its moving direction to support a first, a second and a third hexagonal guide frame 71, 72 and 73.

Figure 5:
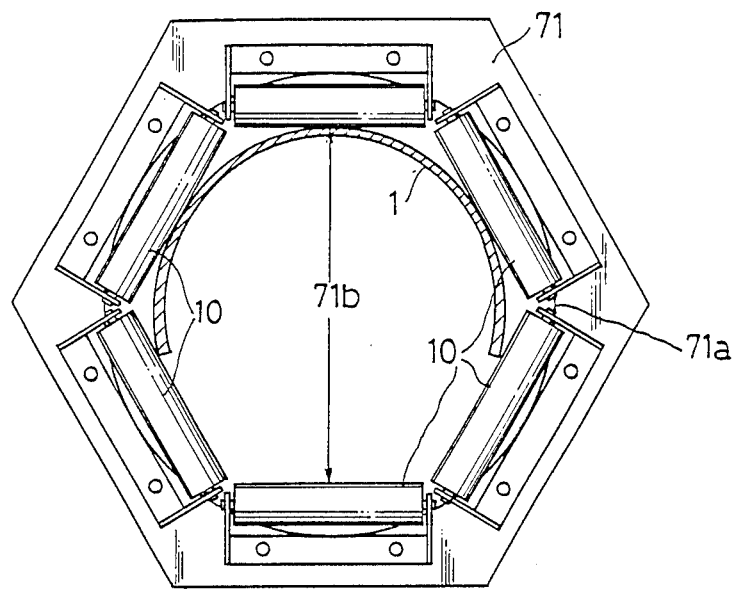
FIG. 5 is an enlarged sectional view taken along line C—C in FIG. 4.

As shown in FIG. 5, the first hexagonal guide frame 71 includes in the center a circular opening 71a through which the conveyor belt 1 passes, and six guide rollers 10 are arranged like a circle inside the opening 71a. These guide rollers 10 engage with the circumference of the belt 1 to guide it.

Figure 6:
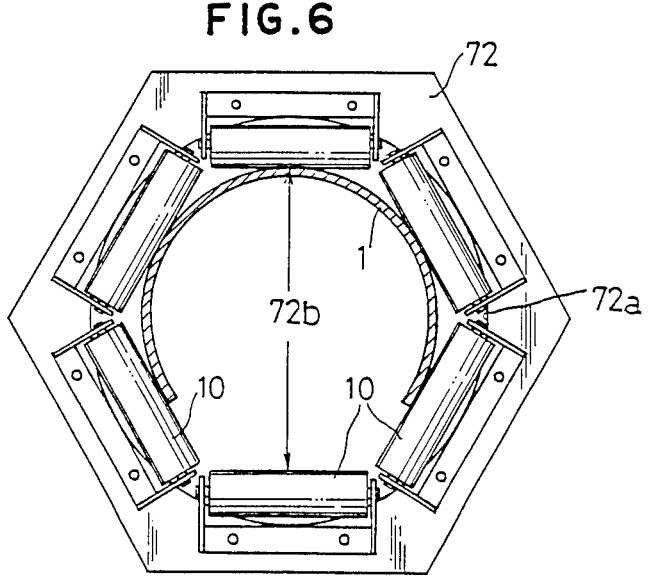
FIG. 6 is an enlarged sectional view taken along line D—D in FIG. 4.
Figure 7:
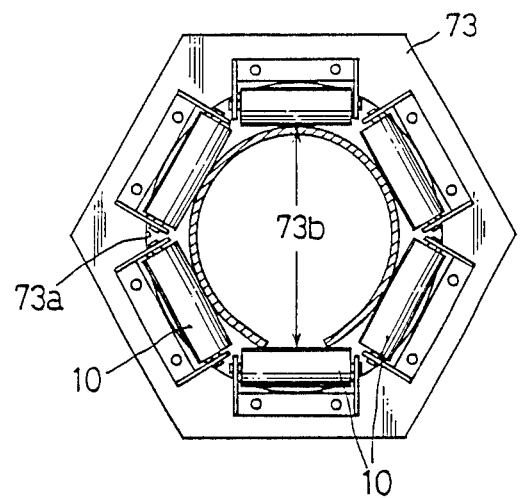
FIG. 7 is an enlarged sectional view taken along line E—E in FIG. 4.

As shown in FIGS. 6 and 7, the second and third hexagonal guide frames 72 and 73 are similar to the first hexagonal guide frame 71 in structure, as mentioned above. The three frames are analogous and become smaller in order. Especially, it should be noted that the diameters 71b, 72b and 73b of inscribed circles formed by connecting the outer peripheries of the guide rollers 10 becomes smaller gradually.

This belt guiding device 7 may be used in combination with lobe-shaped rollers (not shown) which support the return belt of the trough converting portion 1c.

In FIG. 1, the numeral 11 shows a flow-down tube which is integrally connected with the hopper 4.

The function which is performed by the invention in the above-mentioned embodiment will be desecribed hereafter. Fluidizable powdered material 9 in the hopper 4 flows down through the flow-down tube 11 onto the forward path 1a, which runs through each belt shape maintaining frame 6. The forward path 1a which gets out of the belt shape maintaining frame provided near front end roller 2 opens, so that the conveyed material 9 is thrown onto a receiver 5 surrounding the front end roller 2.

The return path 1b travelling around the front end roller 2 is subject to frictional resistance when it enters into the belt shape maintaining frame 6 provided at the front end. Thus, the trough converting portion becomes slackened. But, the slackness can be decreased by the guide frames 71, 72 and 73 so as to guide the return path 1b into the belt shape maintaining frame 6 smoothly, and, then, this return path 1b passes through the lower compartment 6c in each belt shape maintaining frame 6 to come back to the rear end roller 3 for circulation.

Figure 8:
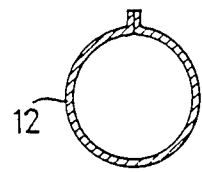
FIG. 8 is a sectional view showing another embodiment of a conveyor belt to which the present invention applies.

The embodiment mentioned above relates to a tubular belt conveyor in which a flattened belt is rolled up into a tubular shape by overlapping the inner surface of one side end on the outer surface of the other side end along its entire length, but the present invention may also apply to a tubular belt conveyor in which a flattened belt is rolled up by contacting the inner surfaces of both side ends with each other to form a projection as shown in FIG. 8, or by contacting or approaching the side edges to each other along its entire length.

Figure 9:
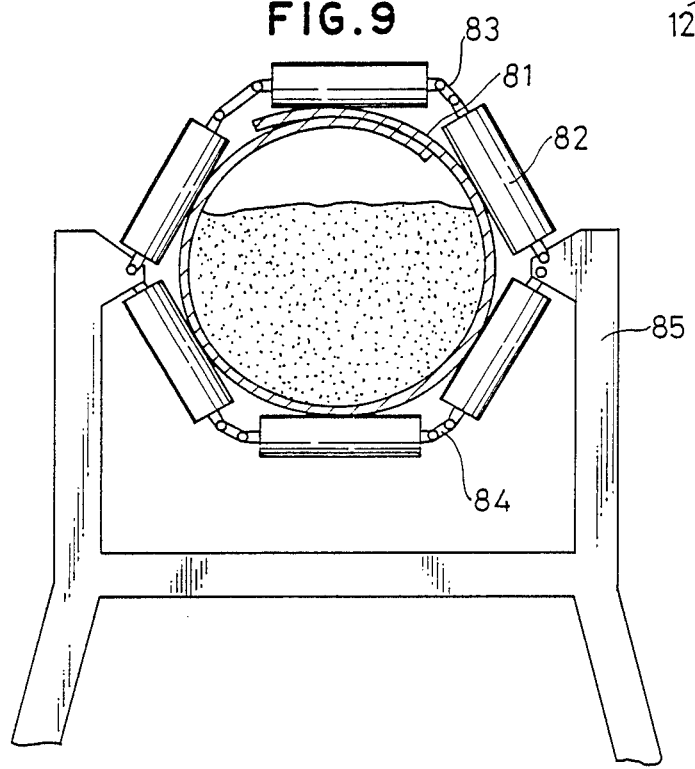
FIG. 9 is a sectional view showing a conveyor belt supported by rollers connected by links.

Also, as shown in FIG. 9, the present invention may apply to a tubular belt conveyor in which a conveyor belt 81 is supported by a conventional embodiment with three upper rollers 82 and three lower rollers 82 connected by an upper and a lower link 83 and 84 respectively which may be used like a guide frame with the present invention. The links 83 and 84 are supported at the side ends by a U-shaped support frame 85. The conventional rollers 82, links 83 and 84 and frame 85 may be used to form guide frames with rollers 82 forming circles of gradually decreasing diameters that may be used for the belt guiding device in the present invention to prevent a belt from loosening so as to assure smooth running. In such a conveyor, the forward and return paths are arranged side by side horizontally, which is different from a vertical arrangement in the foregoing embodiments.

Further, the embodiment mentioned above describes a belt guiding device provided on the trough converting portion at the beginning part of the return belt to prevent the belt from loosening. However, the device may be provided at the beginning part of the forward belt. In this case, it not only prevents the belt from loosening which is caused by the weight of the conveyed material, but also the belt can be smoothly guided as a tubular or arcuated shape even if the belt is twisted or is loaded to open the side edge of the belt.

Also, the belt guiding device may be provided at the terminating end of the forward or the return path, whereby the belt may be guided smoothly as well.

In each guide frame 71, 72 and 73 of the above-mentioned embodiments, the guide rollers 10 are arranged like a hexagon, but may be like other polygons.

The belt guiding device according to the present invention may be located at any trough converting portion of the beginning and the terminating parts of the forward or the return path of the belt. By the location, the belt can be smoothly guided in a tubular or an arcuate form without disadvantages such as loosening or spreading of the opening, even if the belt is twisted around its lonitudinal axis or is undesirably loaded by the weight of conveyed material or belt itself. Therefore, it is advantageous to prevent the belt from surging at the trough converting portion so that it may always run at constant speed and not to give the belt large stress which effects impact to members such as the front or the rear end roller.

It should be noted that the foregoing only relates a preferred embodiment of the present invention, and that modification or variation may be made by person skilled in the art without departing from the spirit of the invention.

The scope of the invention is therefore to be determined solely by the appended claims:

What is claimed is:

1. A tubular belt conveyor comprising:
   a front end roller provided at the front end of the conveyor;
   a rear end roller provided at the rear end;
   an endless belt which is rolled up into a tubular shape for conveying material, flat portions of the belt being wound around the front and rear end rollers so that the belt may circulate between the two end rollers; and
   a belt guiding device selectively disposed at the portion of the belt in which the belt is selectively rolled up from a flat shape into a tubular shape and unrolled from the tubular shape into the flat shape, the device comprising a base plate and a plurality of guide frames provided on the base plate, each guide frame having a plurality of guide rollers extending 360 degrees around the belt forming a circular opening with a diameter through which the belt to be rolled up passes, the diameter of the circular opening formed by the guide rollers within the guide frames decreasing in size gradually from near where the belt is flat to near where the belt is rolled up into a tubular shape so that slack is decreased in the belt and the belt is guided smoothly through the guide frames in order to selectively roll and unroll the belt.

2. A tubular belt conveyor as defined in claim 1, wherein the belt guiding device is disposed at the beginning part of the return path of the belt.

3. A tubular belt conveyor as defined in claim 1, wherein the belt guiding device has three guide frames, each of the guide frames having six guide rollers.

4. A tubular belt conveyor as defined in claim 1, wherein the belt is rolled up by overlapping the inner surface of one side end on the outer surface of the other side end along its entire length.

5. A tubular belt conveyor as defined in claim 1, wherein the belt is rolled up by contacting the inner surfaces of the side ends with each other to form a projection along its entire length.

* * * * *